US006967785B2

(12) United States Patent
Makii et al.

(10) Patent No.: US 6,967,785 B2
(45) Date of Patent: *Nov. 22, 2005

(54) LENS DRIVING MECHANISM AND IMAGE CAPTURE APPARATUS

(75) Inventors: Tatsuo Makii, Tokyo (JP); Nobuaki Aoki, Tokyo (JP); Hiroto Ogiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/109,744

(22) Filed: Apr. 20, 2005

(65) Prior Publication Data

US 2005/0195494 A1 Sep. 8, 2005

Related U.S. Application Data

(63) Continuation of application No. 10/846,636, filed on May 17, 2004.

(30) Foreign Application Priority Data

May 19, 2003 (JP) .............................. 2003-140027

(51) Int. Cl.[7] .......................... G02B 15/14; G02B 7/02
(52) U.S. Cl. ........................ 359/696; 359/694; 359/823
(58) Field of Search ........................ 359/694, 696–698, 359/702, 703, 823, 824

(56) References Cited

U.S. PATENT DOCUMENTS

| 5,655,838 | A | 8/1997 | Ridley et al. |
| 5,966,248 | A | 10/1999 | Kurokawa et al. |
| 6,501,604 | B2 | 12/2002 | Onda |
| 6,762,888 | B1 | 7/2004 | Oshima |
| 6,813,441 | B2 | 11/2004 | Yamazaki |

FOREIGN PATENT DOCUMENTS

| JP | 2003131109 A | 5/2003 |
| JP | 2003195142 A | 7/2003 |

*Primary Examiner*—Ricky Mack
(74) *Attorney, Agent, or Firm*—Oblon, Spivak, McClelland, Maier & Neustadt, P.C.

(57) ABSTRACT

This prevents biting and miniaturizes an entire mechanism. There is provided a lens driver including: a driver having a frame that holds a lens and a bearing for receiving a guiding axis to move the lens in an optical axis direction, a lead screw in which a screw to which a nut is screwed is formed, and a stepping motor for rotating the lead screw; an arm extended from the frame, in such a way a tip being next to the nut, and moving the frame by movement of the nut; a spring for pushing an arm tip towards the nut; and an idle rotation section placed on only side where the arm is placed for the nut at a lead screw end of the driver, and has an axis diameter disabling the nut to be screwed. Also there is provided an image capture apparatus having the lens driver.

1 Claim, 7 Drawing Sheets

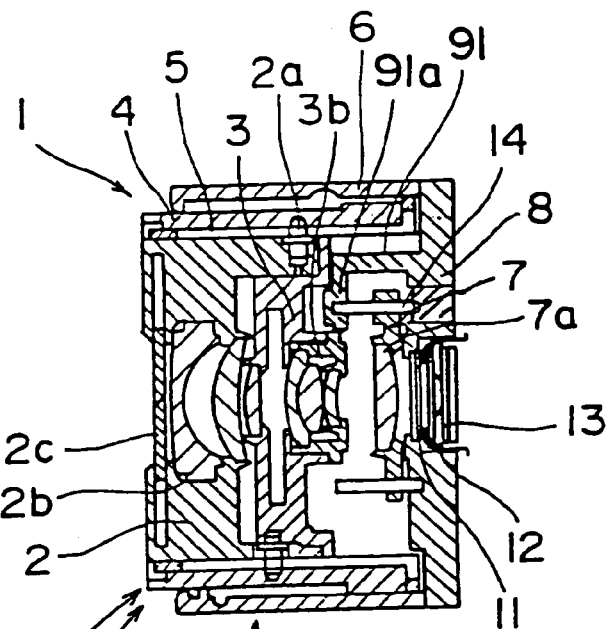
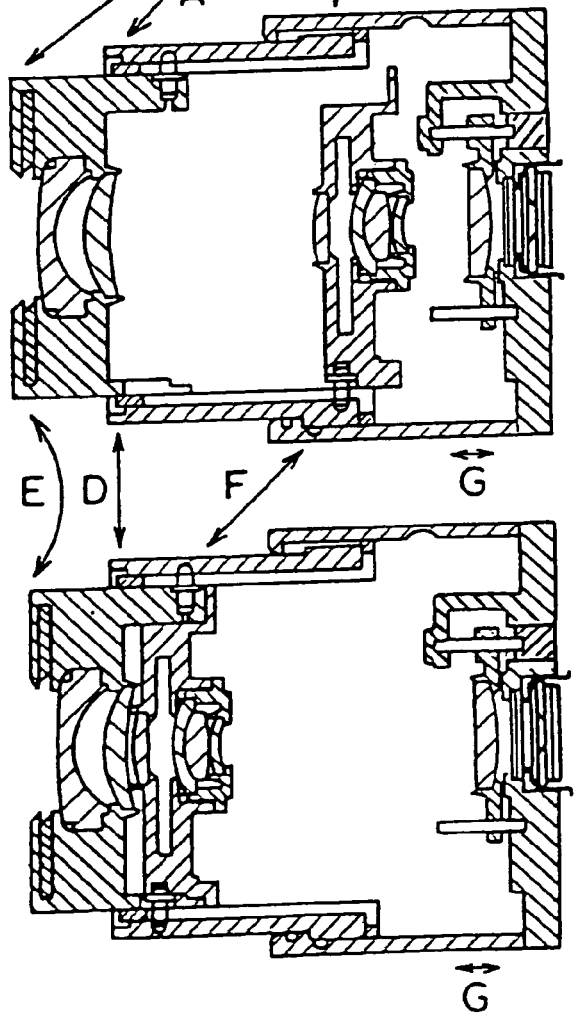
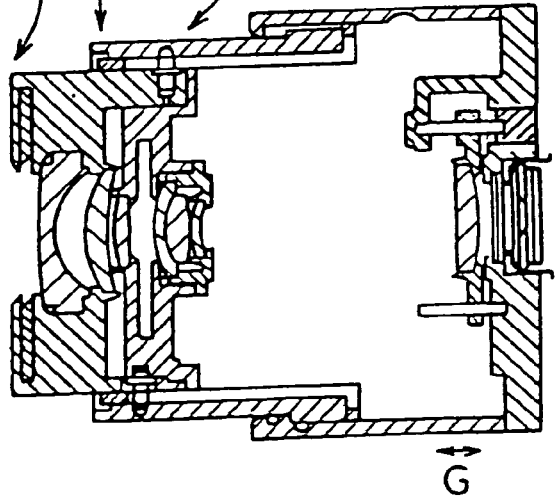
FIG. 2A
FIG. 2B
FIG. 2C

LENS DRIVING MECHANISM AND IMAGE CAPTURE APPARATUS

CROSS REFERENCES TO RELATED APPLICATIONS

This application is a continuation application of U.S. application Ser. No. 10/846,636, filed on May 17, 2004 and based upon and claims the benefit of priority to Japanese Patent Application No. 2003-140027, filed on May 19, 2003, the entire contents each of which are incorporated herein by reference.

BACKGROUND OF THE INVENTION

1. Field of the Invention

The present invention relates to a lens driving mechanism and an image capture apparatus that move a lens, which carries out a focusing operation and the like, in an optical axis direction, and more specifically a lens driving mechanism and an image capture apparatus that have a clearance in the driving mechanism if an error occurs in a movement control of a lens.

2. Description of Related Art

In recent years, improvement of portability and advancement of convenience are demanded for the image capture apparatuses, such as a digital still camera, a digital video camera and the like. Furthermore, reduction of the total apparatus size and sizes of an optical system barrel and lens used in the image capture apparatus are advanced. Further, demands for higher picture quality and more pixels are also strong. Accordingly, the miniaturization of the optical system barrel is desirable by reducing the size of the driving mechanism even if the lens that is a constituting element of the optical system is made larger.

Further, with regard to a so-called collapsible lens used in the image capture apparatus, such as a digital still camera, a digital video camera and the like, reduction in size and thickness are desirable in view of portability convenience as mentioned above. Specifically, there is a trend such that modern digital still camera having higher portability and convenience is more favored, since it can be put in a pocket of a shirt or a pocket of jeans and the like. Accordingly, for the optical system barrel, reduction in its thickness is highly desirable.

Such a collapsible lens and collapsible barrel are disclosed in Japanese Patent Application Publication JP 2002-296480, and the lens driving mechanism is disclosed in Japanese Patent Application Publication JP 2002-287002 and the like. In these techniques, a lead screw, a guiding axis, a nut and forcing element are used to constitute the lens driving mechanism. The movement of the nut through the rotation of the lead screw causes a lens holding frame to move in a direction of an optical axis.

[Patent Document 1]

Japanese Patent Application Publication JP 2002-296480

[Patent Document 2]

Japanese Patent Application Publication JP 2002-287002

SUMMARY OF THE INVENTION

However, in such conventional techniques, if a control error or the like occurs and cause parts that is to be driven (a lens frame) to reach an end of driving limit, the nut tries to move beyond a movement limit. In consequence, biting of a screw thread of the nut may occur, and become a cause of parts damage and troubles in cameras.

In the technique disclosed in Japanese Patent Application Publication JP 2002-287002 an idle rotation section for idly rotating nuts are placed at a base section and a tip section of the lead screw, as a unit for preventing such biting of the screw thread of the nut.

However, if such an idle rotation section is provided, it is very difficult to shorten the lead screw. Further, since the forcing element is placed on the base side and tip side of the guiding axis, it is difficult to shorten the guiding axis and a tip cover of the guiding axis. In consequence, there is drawback such that those factors may become hindrance to further reduction in size of the lens barrel, which is configured as a unit, and reduction in thickness of storage space for the collapsible barrel.

The present invention is made in view of above-mentioned background. According to an embodiment of the present invention, there is provided a lens driving mechanism including: a lens holder that holds a lens and has a bearing section for receiving a axis for guiding the lens to move in an optical axis direction; driving means that has an output axis, in which a screw section to which a nut is screwed is formed, and a driving source for rotating the output axis; an arm that is provided by extending the lens holder, in such a way that a tip being located next to the nut of the driving means, and moves the lens holder with movement of the nut; forcing means for forcing the tip of the arm in a direction to the nut; and an idle rotation section that is placed on one side, on which the arm is placed for the nut, at an end of the output axis of the driving means, and has an axis diameter which disables the nut to be screwed. Further, there is provided an image capture apparatus having this lens driver.

In present invention having the above-mentioned configuration, the idle rotation section is provided on only one end of the output axis to which the nut is screwed. Accordingly, as compared with a case in which the idle rotation sections are placed both ends of the output axis, the present invention makes it possible to shorten the length of the output axis.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIGS. 2A, 2B and 2C are sectional views of the collapsible lens;

DESCRIPTION OF THE EMBODIMENT

Figure 1A:
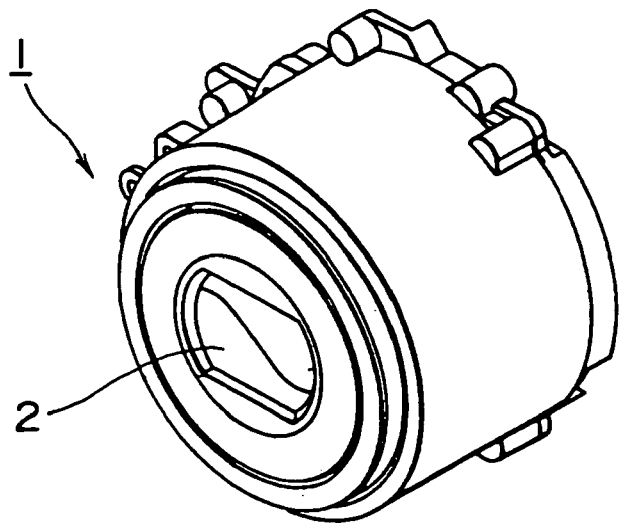
FIGS. 1A, 1B and 1C are perspective views explaining a situation of a collapsible lens.
Figure 1B:
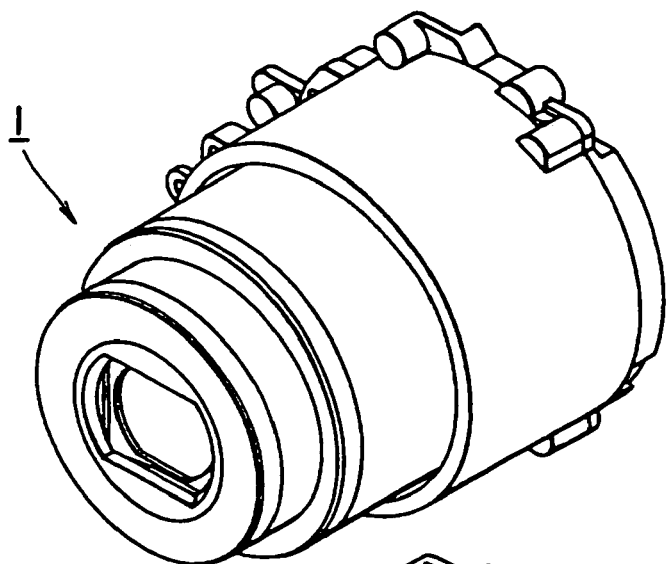
Figure 1C:
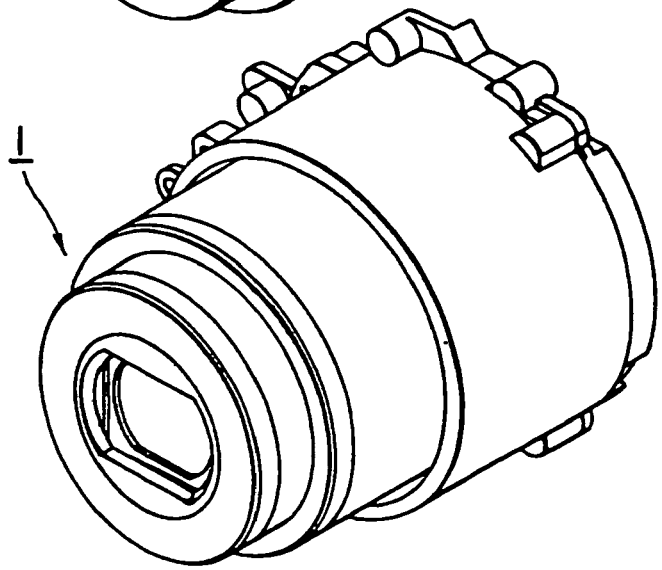
Figure 3:
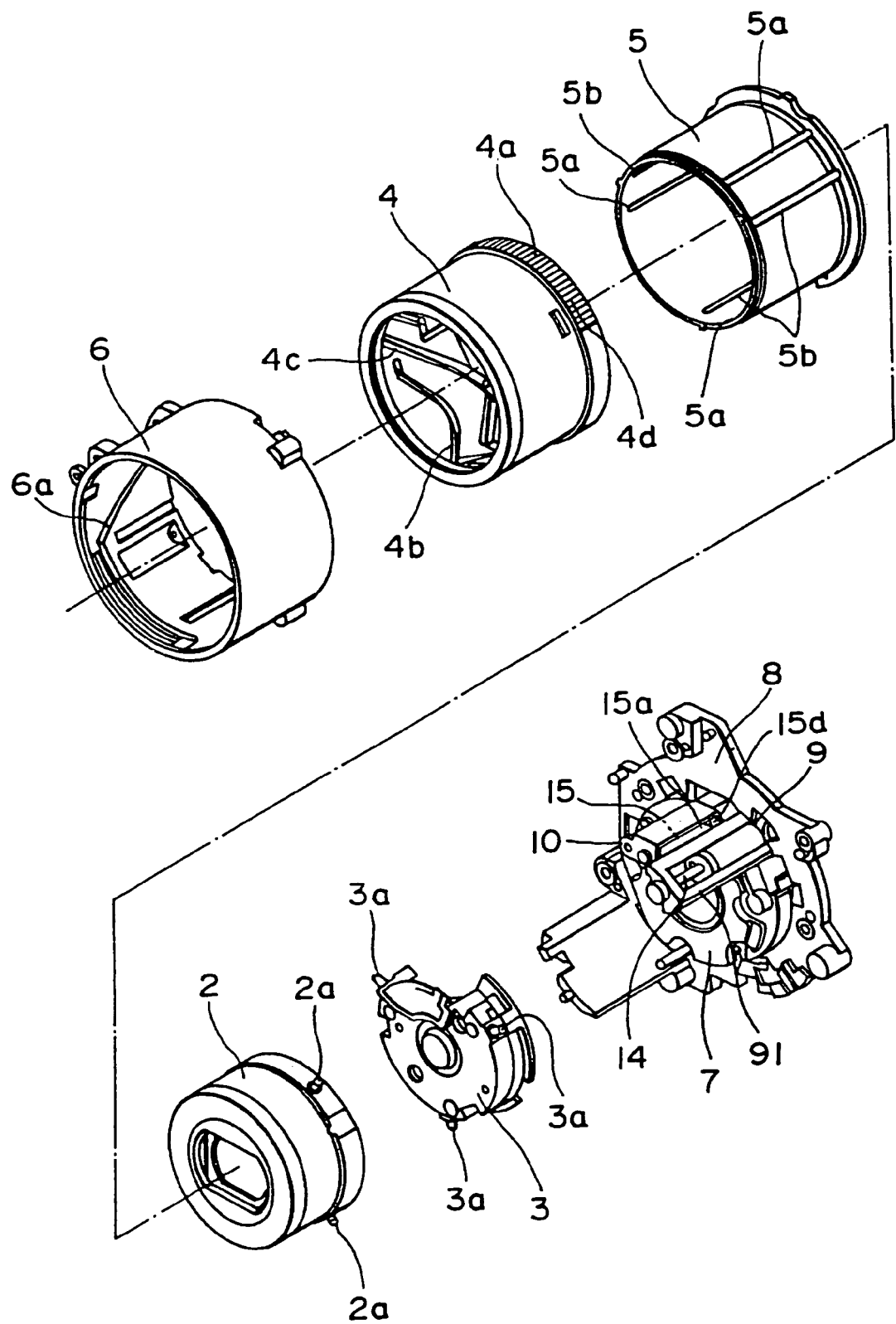
FIG. 3 is an exploded perspective view of the collapsible lens.

Embodiments of the present invention will be described below with reference to the attached drawings. At first, a lens barrel (a collapsible lens) of an image capture apparatus, which may be employed in a lens driving mechanism according to an embodiment of the present invention is applied, is explained. FIGS. 1A, 1B and 1C are perspective views for explaining modes of the collapsible lens. FIG. 1A shows a lens storage space mode when it is not used, namely, a collapsed mode, FIG. 1B shows a WIDE mode, and FIG. 1C shows a TELE mode. Further, FIGS. 2A, 2B and 2C are sectional views of the collapsible lens. FIG. 2A shows the sinking mode, FIG. 2B shows the WIDE mode, and FIG. 2C shows the TELE mode. Further, FIG. 3 is an exploded perspective view of the collapsible lens.

A collapsible lens 1 has, in an optical sense, a three-group configuration. A first group and a second group carry out a zooming operation by driving them in an optical axis direction along a predetermined cam curve, and a third group carries out a focusing operation by being slightly displaced in the optical axis direction. In other words, the collapsible lens 1 has a configuration such that the displacements of the first and second groups vary a focal distance and the displacement of the third group performs proper focusing.

A first group frame 2 includes: three (a plurality of) cam pins 2a to be engaged with cam grooves 4b of a cam ring 4; a plurality of lens spaces 2b for inserting and fixing a plurality of lenses constituting the first group; and a barrier mechanism section 2c for protecting a front lens in the sinking mode when it is stored. For example, the first group frame is formed with polycarbonate resin (black) including glass fiber, and has strength, a light shielding property and is suited for mass-production.

A second group frame 3 includes: three (a plurality of) cam pins 3a to be engaged with cam grooves 4c of the cam ring 4; and a plurality of lens spaces 3b for inserting and fixing a plurality of lenses constituting the second group. For example, the second group frame is formed with polycarbonate resin (black) including glass fiber, and has strength, a light shielding property and is suited for mass-production. Alternatively, there may be a case that an iris shutter mechanism is further provided.

The cam ring 4 includes: a gear section 4a for rotationally driving the cam ring 4 with an inner diameter of a fixed barrel 6 by being driven by a gear unit 10; three (a plurality of) cam grooves 4b with which the cam pins 2a of the first group frame 2 are engaged; three (a plurality of) cam grooves 4c with which the cam pins 3a of the second group frame 3 are engaged; and three (a plurality of) cam pins 4d that is to be engaged with cam grooves 6a of the fixed ring 6. For example, the cam ring 4 is formed with polycarbonate resin (black) including glass fiber, and has strength, a light shielding property and is suited for mass production.

The cam grooves 4b and 4c move the first and second groups in the optical axis direction along a predetermined curve and carry out a zooming operation. A linear-movement guiding ring 5 is a member that is moved in the optical axis direction with the inner diameter of the fixed ring 6 integrally with the cam ring 4, and it includes: a guiding groove 5a for guiding the first group frame 2 in the optical axis direction; and a guiding groove 5b for guiding the second group frame 3 in the optical axis direction. For example, the cam grooves 4b and 4c are formed with polycarbonate resin (black) including glass fiber, and has strength, a light shielding property and is suited for mass-production.

The fixed ring 6 is the member fixed to a rear barrel 8, and has the three (the plurality of) cam grooves 6a with which the cam pins 4d of the cam ring 4 are engaged. For example, the fixed ring 6 is formed with polycarbonate resin (black) including glass fiber, and has strength, a light shielding property and is suited for mass-production.

A third group frame 7 includes a lens space 7a for inserting and fixing the lenses constituting the third group. For example, the third group frame 7 is formed with polycarbonate resin (black) including glass fiber, and has strength, a light shielding property and is suited for mass-production. The third group frame 7 is movably held in the optical axis direction with respect to the rear barrel 8. A third group frame 7 can be slightly displaced in the optical axis direction by a driving source such as a stepping motor 15 or the like. This third group frame 7 corresponds to the lens holder of a lens driving mechanism according to the present embodiment.

The rear barrel 8 includes: a recessed section for inserting, positioning and fixing an optical filter 11 such as an optical low-pass cut filter, an infrared cut filter or the like; and a recessed section for inserting a sealing rubber 12 to keep dust and the like out of the barrel and to elastically apply force to the optical filter 11. For example, the rear barrel 8 is formed with polycarbonate resin (black) including glass fiber, and has strength, a light shielding property and is suited for mass-production. A solid imaging device 13, such as CCD, MOS or the like, is positioned and fixed to the rear barrel 8 at a high precision.

The gear unit 10 drives the cam ring 4 through the gear sections 4a. A gear ratio is determined such that sufficient driving force may be obtained in the mode ranges of "Collapsed→WIDE→TELE" and "TELE →WIDE→Collapsed". The gear unit 10 drives the cam ring 4 so as to carry out the zooming operation of the collapsible lens.

The stepping motor 15 includes: a lead screw 15a for displacing the third group frame 7 in the optical axis direction; and an attachment 15d to be positioned and fixed to the rear barrel 8. This stepping motor 15 corresponds to the driving source of the lens driving mechanism, and the lead screw 15a corresponds to the output axis according to the present embodiment.

The operation of the lens will be described below. In the operation between the collapsed mode and the optical WIDE mode, the cam ring 4 is driven by applying driving force to the gear section 4a from the gear unit 10. Next, while the cam pin 4d is rotated along the cam groove 6a of the fixed ring 6, the cam ring 4 is moved towards a side of an object to be imaged in the optical axis direction. At this time, the linear-movement guiding ring 5 is moved integrally with the cam ring 4 (refer to an arrow A of FIGS. 2A, 2B and 2C).

At this time, in the first group frame 2, the cam pins 2a are moved on a predetermined curve along the cam groove 4b and the guiding groove 5a (refer to an arrow B of FIGS. 2A, 2B and 2C). At this time, in the second group frame 3, the cam pins 3a are moved on a predetermined curve along the cam groove 4c and the guiding groove 5b (refer to an arrow C of FIGS. 2A, 2B and 2C). As mentioned above, the first and second groups are moved to the predetermined positions and optically located at the WIDE positions.

Further in the operation between the optical WIDE mode and the optical TELE mode, the cam ring 4 is driven by applying driving force to the gear section 4a from the gear unit 10. In this operation range, the cam groove 6a is formed such that the cam ring 4 is not driven in the optical axis direction. Further, the linear-movement guiding ring 5 is not moved in the optical axis direction (refer to an arrow D of FIGS. 2A, 2B and 2C).

At this time, in the first group frame 2, the cam pins 2a are moved through the predetermined curve along the cam groove 4b and the guiding groove 5a (refer to n arrow E of FIGS. 2A, 2B and 2C). At this time, in the second group frame 3, the cam pins 3a are moved through the predetermined curve along the cam groove 4c and the guiding groove 5b (refer to an arrow F of FIGS. 2A, 2B and 2C). As mentioned above, the first and second groups are moved along the predetermined curves and optically moved between the WIDE and the TELE, thereby carrying out the zooming operation.

An operation of the optical WIDE→the optical TELE→the collapsing mode, is carried out by rotating the cam ring 4 in the opposite direction by being driven by the gear unit 10 in a direction opposite to the above-mentioned operation. Since the cam ring 4 is driven by the gear unit 10 as mentioned above, the collapsible lens 1 carries out the collapsing operation and the zooming operation. On the other hand, by the driving source such as the stepping motor 15 different from the above-mentioned driving source, the third group is slightly displaced in the optical axis direction. Accordingly, the focusing operation is carried out (refer to an arrow G of FIGS. 2A, 2B and 2C).

Figure 4:
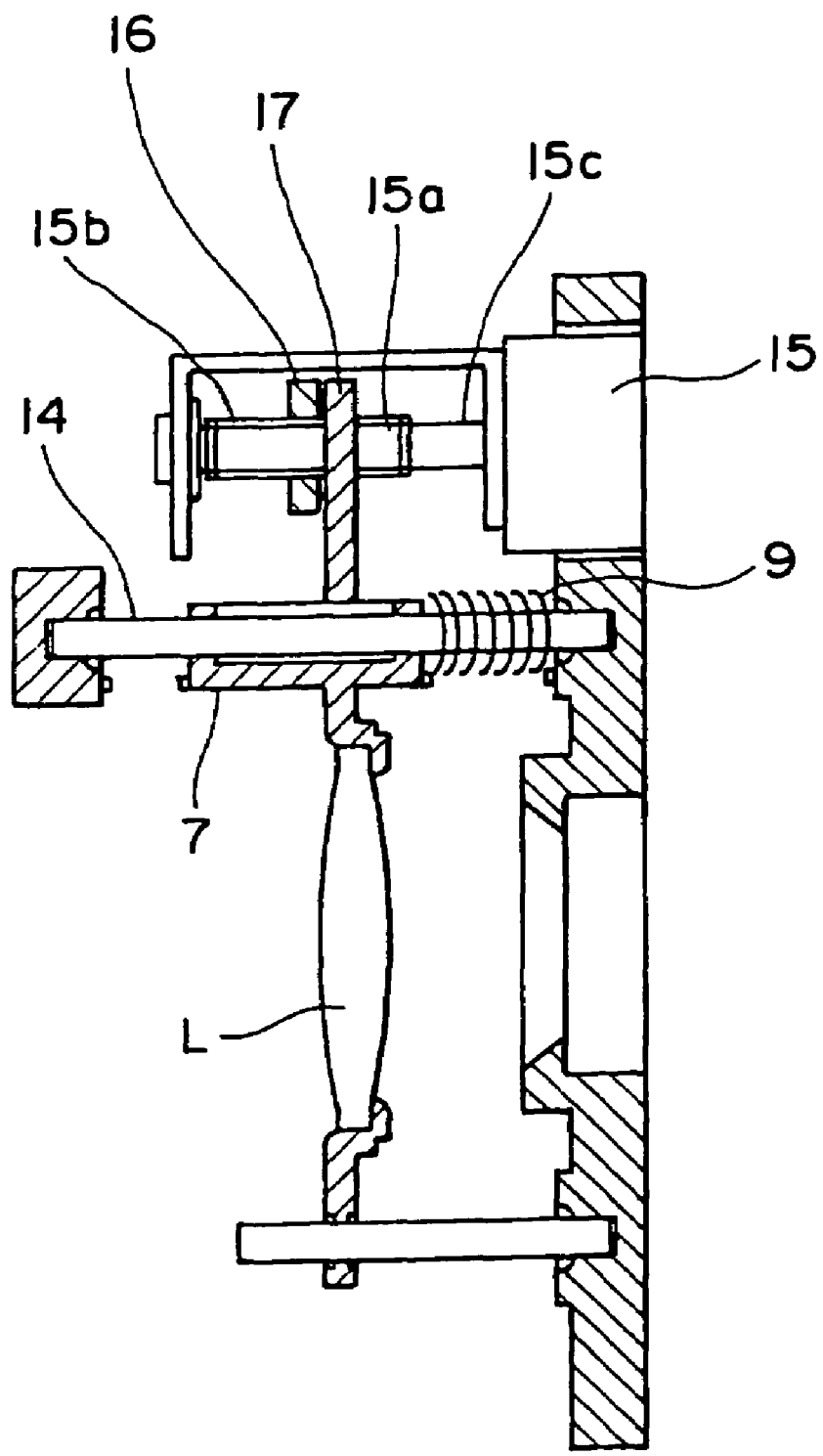
FIG. 4 is a partially sectional view explaining a first embodiment.

A first embodiment of the lens driving mechanism according to the present invention will be described below. FIG. 4 is a partially sectional view explaining the first embodiment. The lens driving mechanism according to this embodiment is characterized in that an idle rotation section 15c of a nut 16 is provided at only one of the ends of the lead screw 15a serving as the output axis.

The nut 16 is screwed to a threaded portion 15b of the lead screw 15a, and the nut 16 is allowed to be advanced or retreated in the optical axis direction by the rotation of the lead screw 15a, in which the stepping motor 15 serves as the driving source. An arm 17 placed next to the nut 16 is provided by extending the third group frame 7 that serves as the lens holder. Next, when the nut 16 is moved towards the right direction of FIG. 4, the arm 17 moves the third group frame 7 towards the right direction of FIG. 4 against force of a spring 9 that is placed around a guiding axis 14.

In addition, there is no lubricious grease in a bearing section between the third group frame 7 and the guiding axis 14. Accordingly, since the spring 9 is placed around the guiding axis 14, the dispersion of the grease caused by the expansion and contraction of the spring 9 is not occurred.

Further, the arm 17 is not connected to the nut 16. When the nut 16 is moved toward the left direction in FIG. 4, the force of the spring 9 forces the arm 17 towards the side of the nut 16, thereby moves the third group frame 7 toward the left direction of FIG. 4.

In the present embodiment, the idle rotation section 15c is placed on only the imaging device side (the right side of FIG. 4) at the ends of the lead screw 15a. The idle rotation section 15c is the portion where the threaded portion 15b is not placed, and the screw thread of the nut 16 is not engaged. Thus, if the nut 16 moves to the right direction of FIG. 4 and exceeds the threaded portion 15b of the lead screw 15a, this results in the situation that at the idle rotation section 15c, only the lead screw 15a is idly rotated, which is possible to prevent the further movement of the nut 16 and accordingly prevent the movements of the arm 17 and the third group frame 7.

On the other hand, if the rotation of the lead screw 15a is stopped, the nut 16 is urged towards the left direction of FIG. 4 by the spring 9. Thus, by rotating the lead screw 15a in the direction opposite to the above-mentioned case, this results in the situation that the screw thread of the nut 16 is engaged with the screw thread 15b of the lead screw 15a. Hence, it becomes possible to return to the movement towards the left direction of FIG. 4 in association with the rotation of the lead screw 15a.

For example, if an initial position adjustment (a focus reset or the like) of a lens L is carried out, a controller (not shown) controls the rotation of the lead screw 15a so that the nut 16 always reaches the idle rotation section 15c. After the nut 16 reaches the idle rotation section 15c, the lead screw 15a is reversely rotated. Thus, the nut 16 is engaged with a starting edge of the screw thread 15b.

Accordingly, it becomes possible to accurately adjust the initial position of the lens L. In addition, if the lens L is a focus lens, it is possible to prevent biting of the screw thread of the nut 16 even though a trouble such as a focus error and the like occurs, if the controller to control the rotation of the lead screw 15a so that the nut 16 always reaches the idle rotation section 15c.

In the above-mentioned first embodiment, it is enough to place the idle rotation section 15c on only one side of the ends of the lead screw 15a. Thus, as compared with the mechanism in the related art in which the idle rotation sections are placed on both ends of the lead screw 15a, the length of the lead screw 15a maybe shortened, which allow the entire lens barrel to be thinner.

Further, the idle rotation section 15c is placed at the end of the imaging device side (the right side of FIG. 4) in the lead screw 15a, and the arm 17 and the spring 9 are placed on the photographing device side with respect to the nut 16. Accordingly, even if the nut 16 is not moved since the power source to the stepping motor 15 is turned off when the lens L is collapsed (refer to FIGS. 1A, 2A), the third group frame 7 is allow to be pushed into the imaging device side, thereby attaining the thinner size at the time of storage space of the lens L.

Figure 5:
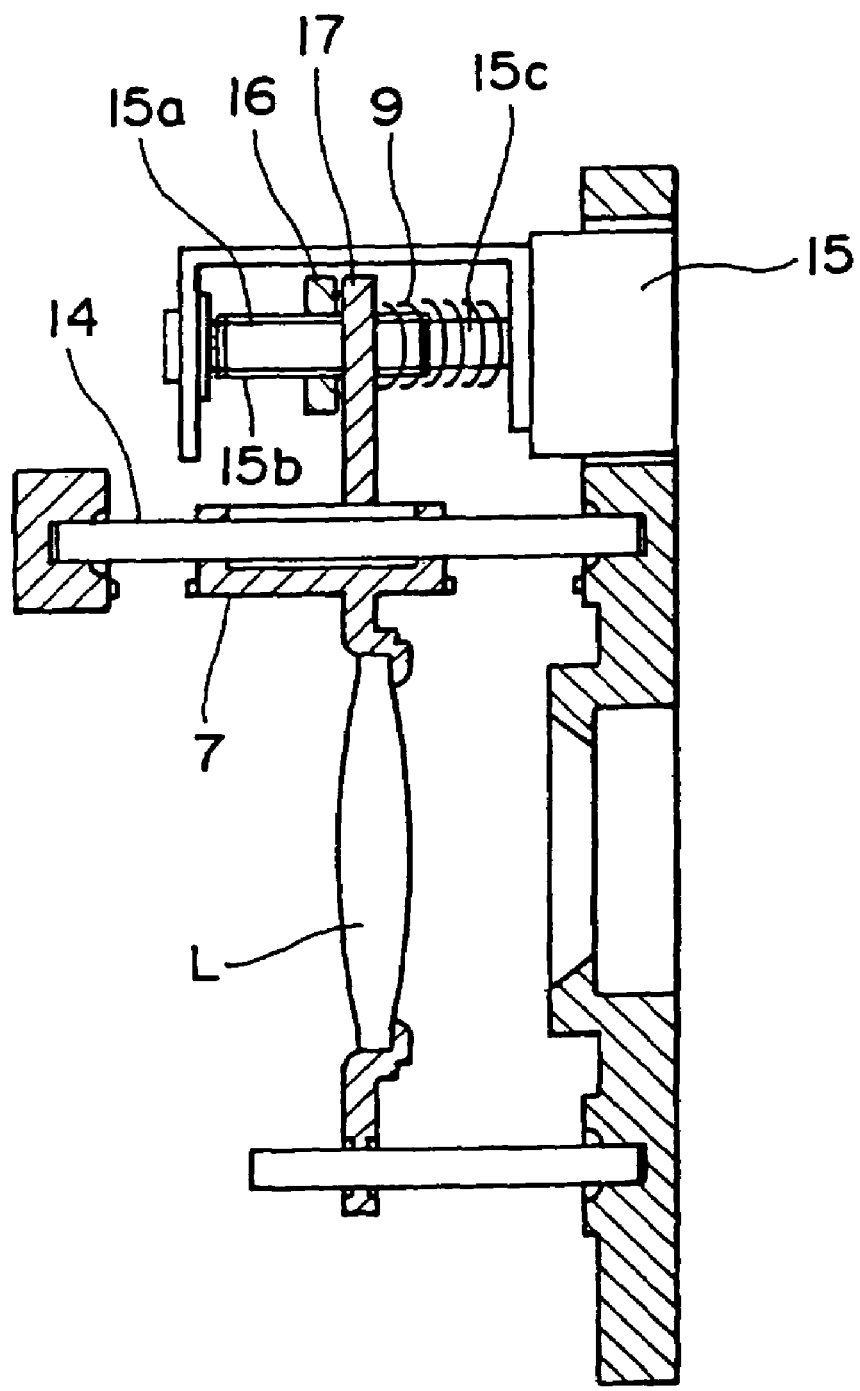
FIG. 5 is a partially sectional view explaining a second embodiment.

A second embodiment of the lens driving mechanism according to the present invention will be described below. FIG. 5 is a partially sectional view explaining the second embodiment. The lens driving mechanism according to this embodiment is characterized in that an idle rotation section 15c of a nut 16 is placed at only one of the ends of a lead screw 15a that serves as the output axis and also characterized in that a spring 9 serving as the forcing element is placed around a lead screw 15a. The latter characteristics are distinct feature from the first embodiment.

In the present embodiment, similar to the first embodiment, a nut 16 is screwed to a threaded portion 15b of the lead screw 15a, and the nut 16 is allow to be advanced or retreated in the optical axis direction by the rotation of the lead screw 15a, in which the stepping motor 15 serves as the driving source. The arm 17 placed next to this nut 16 is placed extendedly from the third group frame 7 serving as the lens holder. Then, when the nut 16 is moved towards the right direction of FIG. 5, the arm 17 moves the third group frame 7 in the right direction of FIG. 5 by prevailing against the force of the spring 9.

Further, the arm 17 is not connected to the nut 16. When the nut 16 is moved in the left direction of FIG. 5, the pushing force of the spring 9 placed around the lead screw 15a pushes the arm 17 towards the side of the nut 16, thereby moving the third group frame 7 to the left direction of FIG. 5.

In this embodiment, similarly to the first embodiment, the idle rotation section 15c is placed on only the imaging device side (the right side of FIG. 5) of both ends of the lead screw 15a. Thus, if the nut 16 moves towards the right direction of FIG. 5 and exceeds the threaded portion 15b of the lead screw 15a, this results in the situation that at the idle rotation section 15c, only the lead screw 15a is idly rotated, which allows to prevent the further movement of the nut 16 and allows to accordingly prevent the movements of the arm 17 and the third group frame 7.

On the other hand, if the rotation of the lead screw 15a is stopped, the nut 16 is pushed in the left direction of FIG. 5 by the spring 9. Thus, by rotating the lead screw 15a in the direction opposite to the above-mentioned case, this results in the situation that the screw thread of the nut 16 is engaged with the screw thread 15b of the lead screw 15a. Hence, it becomes possible to return to the movement towards the left direction of FIG. 5 in association with the rotation of the lead screw 15a.

As mentioned above, it is enough to place the idle rotation section 15c on one side of the ends of the lead screw 15a. Thus, as compared with the conventional mechanism in which the idle rotation sections are placed on both ends of the lead screw 15a, the length of the lead screw 15a may be shortened, which allows the entire lens barrel to be thinner. Further, in the second embodiment, the spring 9 is placed around the lead screw 15a. Thus, a direction of the force to be applied from the nut 16 to the arm 17 and a direction of force with the spring 9 allow to be adjusted coaxially, which enables the arm 17 to move forward and backward smoothly.

Figure 6:
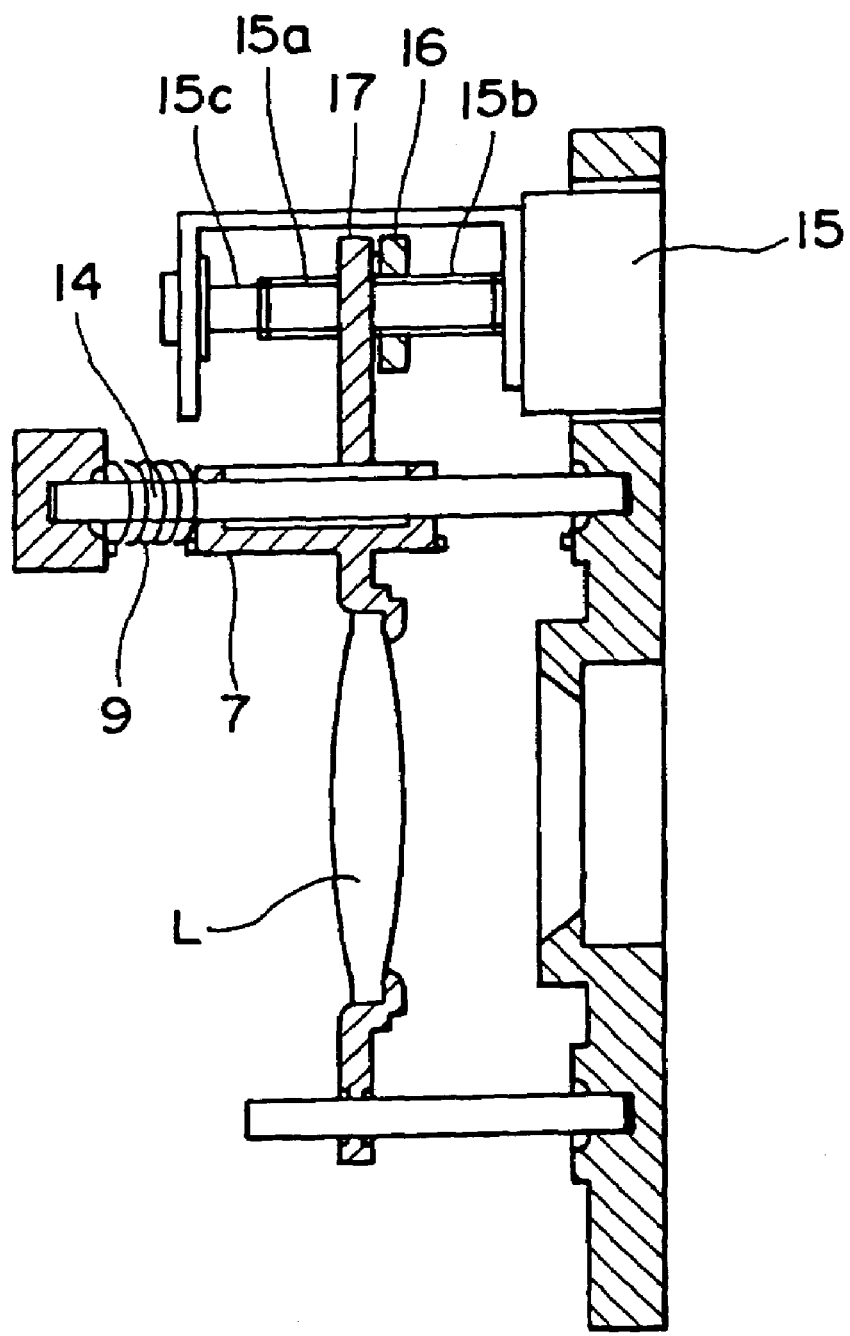
FIG. 6 is a partially sectional view explaining a third embodiment.

A third embodiment of the lens driving mechanism according to the present invention will be described below. FIG. 6 is a partially sectional view explaining the third embodiment. The lens driving mechanism according to this embodiment is characterized in that the idle rotation section 15c of the nut 16 is placed on only the subject side (the left side of FIG. 6) of both ends of the lead screw 15a serving as the output axis.

Because of such arrangement of the idle rotation section 15c, positional relation between the nut 16 screwed to the threaded portion 15b of the lead screw 15a and the arm 17 extended from the third group frame 7 is opposite to the first embodiment.

Thus, in this embodiment, if the nut 16 moves towards the left direction of FIG. 6 and exceeds the threaded portion 15b of the lead screw 15a, this results in the situation that at the idle rotation section 15c, only the lead screw 15a is idly rotated, which is possible to prevent the further movement of the nut 16 and can accordingly prevent the movements of the arm 17 and the third group frame 7.

On the other hand, if the rotation of the lead screw 15a is stopped, the nut 16 is pushed towards the right direction of FIG. 6 by the spring 9. Thus, by rotating the lead screw 15a in the direction opposite to the above-mentioned case, this results in the situation that the screw thread of the nut 16 is engaged with the screw thread 15b of the lead screw 15a. Hence, it becomes possible to return to the movement to the right direction of FIG. 6 in association with the rotation of the lead screw 15a.

In this embodiment, for example, if the initial position adjustment (the focus reset and the like) of the lens L is carried out, the controller (not shown) controls the rotation of the lead screw 15a so that the nut 16 always moves towards the left direction of FIG. 6. After the nut 16 reaches the idle rotation section 15c, the lead screw 15a is reversely rotated. Thus, the nut 16 is engaged with starting edge of the screw thread 15b.

Accordingly, it becomes possible to accurately adjust the initial position of the lens L. In addition, when the lens L is the focus lens, though the trouble such as the focus error and the like is induced, if the controller controls the rotation of the lead screw 15a so that the nut 16 always reaches the idle rotation section 15c, it is possible to surely protect the chamfering of the screw thread of the nut 16.

In such a third embodiment, similarly to the first embodiment, the idle rotation section 15c is placed on only one side of the ends of the lead screw 15a. Thus, as compared with the conventional mechanism in which the idle rotation sections are placed on both ends of the lead screw 15a, the length of the lead screw 15a is allowed to be shortened, which allows to make the entire lens barrel thinner.

Further, there is no lubricious grease in the bearing section between the third group frame 7 and the guiding axis 14. Thus, even if the spring 9 is placed around the guiding axis 14, the dispersion of the grease caused by the expansion and contraction of the spring is not induced.

Moreover, placing the idly rotating section 15c, on only the object side of both ends of the lead screw 15a, allows movement of the lens L to the object side to be easily and accurately controlled. In short, On the side of the near focus of the lens L, the movement distance of the lens L is longer than that on the side of a far focus for the same distance to the object. Accordingly, since the idle rotation section 15c is located on the side of the near focus of the lens L, the threaded portion 15b of the lead screw 15a can be used to the end. Further, since the initial position adjustment of the lens L can be carried out on the side of the near focus, it is possible to carry out the position control at the high precision.

Figure 7:
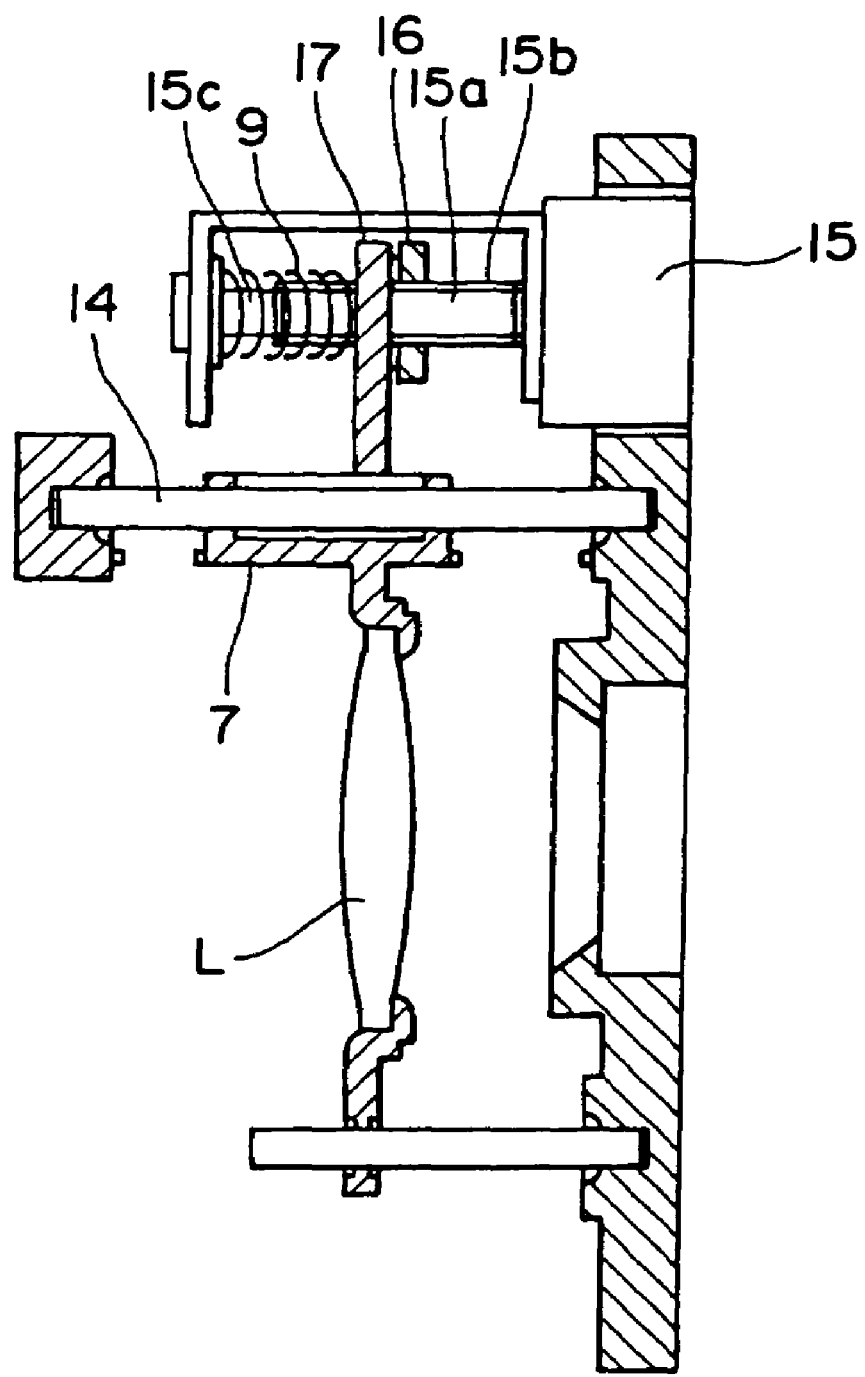
FIG. 7 is a partially sectional view explaining a fourth embodiment.

A fourth embodiment of the lens driving mechanism according to the present invention will be described below. FIG. 7 is a partially sectional view explaining the fourth embodiment. The lens driving mechanism according to this embodiment is similar to the third embodiment, in that the idle rotation section 15c of the nut 16 is placed on only the object side (the left side of FIG. 7) of both ends of the output axis, the lead screw 15a. However, it is different in that the spring 9 serving as forcing element is placed around the lead screw 15a.

Due to such arrangement of the idle rotation section 15c, if the nut 16 moves towards the left direction of FIG. 7 and exceeds the threaded portion 15b of the lead screw 15a, this results in the situation that at the idle rotation section 15c, only the lead screw 15a is idly rotated, which allows to prevent the further movement of the nut 16 and can consequently prevent the movements of the arm 17 and the third group frame 7.

On the other hand, if the rotation of the lead screw 15a is stopped, the nut 16 is pushed towards the right direction of FIG. 7 by the spring 9. Thus, by rotating the lead screw 15a in the direction opposite to the above-mentioned case, this results in the situation that the screw thread of the nut 16 is engaged with the screw thread 15b of the lead screw 15a. Hence, it becomes possible to return to the movement towards the right direction of FIG. 7 in association with the rotation of the lead screw 15a.

In this embodiment, for example, if the initial position adjustment (the focus reset and the like) of the lens L is carried out, the controller (not shown) controls the rotation of the lead screw 15a so that the nut 16 always moves towards the left direction of FIG. 7. After the nut 16 reaches the idle rotation section 15c, the lead screw 15a is reversely rotated. Thus, the nut 16 is engaged with the beginning of the screw thread 15b.

Accordingly, it becomes possible to accurately adjust the initial position of the lens L. In addition, when the lens L is the focus lens, though the trouble such as the focus error and the like is induced, if the controller controls the rotation of the lead screw 15a so that the nut 16 always reaches the idle rotation section 15c, it becomes possible to surely prevent biting of the screw thread of the nut 16.

In such a fourth embodiment, similarly to the first embodiment, the idle rotation section 15c is placed on only one side of the ends of the lead screw 15a. Thus, as compared with the conventional mechanism in which the idle rotation sections are placed on both ends of the lead screw 15a, the length of the lead screw 15a is allowed to be shortened, which allow to make the entire lens barrel thinner.

Further, placing the idle rotation section 15c on only the object side of the ends of the lead screw 15a, allows movement of the lens L to the object side to be easily and accurately controlled. In short, On the side of the near focus of the lens L, the movement distance of the lens L is longer than that of the side of the far focus for the same distance to the object. Accordingly, since the idle rotation section 15c is placed on the side of the near focus of the lens L, the threaded portion 15b of the lead screw 15a can be used to the end. Further, since the initial position adjustment of the lens L can be carried out on the side of the near focus, it is possible to carry out the position control at the high precision.

Further, since the spring 9 is placed around the lead screw 15a, the direction of the force to be applied from the nut 16 to the arm 17 and a direction of force with the spring 9 are possible to be adjusted coaxially. Thus, there is a merit that the advancing and retreating movement of the arm 17 is possible to be smoothly performed.

The above-mentioned respective embodiments have been described by mainly exemplifying the application to the collapsible lens. However, the application range of the present invention is not limited to the above-mentioned collapsible lens. That is, as the configuration of the driving mechanism that allows to be miniaturized and to prevent biting of the nut, it can be widely applied to a fixed barrel (a so-called inner focus lens).

As mentioned above, according to the present invention, it has the following effects. That is, an idle rotation section of a nut and the forcing elements are placed on only one side of the ends of an output axis. Then, if control becomes impossible, by always feeding the output axis in the direction of the idle rotation section, the re-initializing operation is carried out to previously prevent biting between the output axis and the nut. Accordingly, it is possible to remove the idle rotation section and the pusher on the other side, and possible to shorten the output axis, shorten the guiding axis, and shorten a guiding axis presser. Thus, it is possible to miniaturize a lens barrel, and make a storage space of a collapsible lens thin, and further miniaturize the image capture apparatus in which they are mounted.

It should be understood by those skilled in the art that various modifications, combinations, sub-combinations and alterations may occur depending on design requirements and other factors insofar as they are within the scope of the appended claims or the equivalents thereof.

What is claimed is:

1. A lens driving mechanism, comprising:
   a lens holder that holds a lens and has a bearing section for receiving an axis for guiding the lens to move in an optical axis direction;
   driving means that has an output axis, in which a screw section to which a nut is screwed is formed, and a driving source for rotating the output axis;
   an arm that is provided by extending the lens holder, in such a way that a tip being located next to the nut of the driving means, and moves the lens holder with movement of the nut;
   forcing means for forcing the tip of the arm in a direction to the nut; and
   an idle rotation section that is placed on one side, on which the arm is placed for the nut, at an end of the output axis of the driving means, and has an axis diameter which disables the nut to be screwed,
   wherein the forcing means contacts a photographing device side of the arm.

* * * * *